United States Patent [19]

Thompson et al.

[11] Patent Number: 5,243,322

[45] Date of Patent: Sep. 7, 1993

[54] AUTOMOBILE SECURITY SYSTEM

[76] Inventors: Stephen S. Thompson, R.D. 3 #2 Linmar La., Cochranville, Pa. 19330; Michael C. Thompson, 35 Andrew Pl., Baltimore, Md. 21201; Gregory Rice, 416 Grasmere Dr., Aberdeen, Md. 21001; Pradeep Bhagwat, 1 Birchbrook Ct., Baltimore, Md. 21236; Mark Gottlieb, 3495 Pence Ct., Annandale, Va. 22003; Thomas Roche, 6010 Red Fox Dr., Spotsylvania, Va. 22553

[21] Appl. No.: 779,373

[22] Filed: Oct. 18, 1991

[51] Int. Cl.⁵ .............................................. B60R 25/10
[52] U.S. Cl. .................................... 340/429; 340/428; 307/10.2
[58] Field of Search ............... 340/426, 428, 429, 430, 340/440, 539, 541, 587, 566; 307/10.2

[56] References Cited

U.S. PATENT DOCUMENTS

| | | | |
|---|---|---|---|
| 4,383,242 | 5/1983 | Sassover et al. | 340/429 |
| 4,437,089 | 3/1984 | Achard | 340/541 |
| 4,520,280 | 5/1985 | Yoshikawa et al. | 307/358 |
| 4,651,128 | 3/1987 | Kolb | 340/440 |
| 4,754,255 | 6/1988 | Sanders et al. | 340/426 X |
| 4,845,464 | 7/1989 | Drori et al. | 340/429 |
| 4,866,417 | 9/1989 | DeFino et al. | 340/429 |
| 4,881,148 | 11/1989 | Lambropoulos et al. | 361/172 |
| 4,887,064 | 12/1989 | Drori et al. | 340/426 |
| 4,890,108 | 12/1989 | Drori et al. | 341/176 |
| 4,897,630 | 1/1990 | Nykerk | 340/426 |
| 4,922,224 | 5/1990 | Drori et al. | 340/428 |

Primary Examiner—Jeffrey Hofsass
Attorney, Agent, or Firm—Oblon, Spivak, McClelland, Maier & Neustadt

[57] ABSTRACT

A microprocessor controlled automobile security system provides several features for enhanced operability. The system allows a receiving unit to learn a plurality of operating codes from a plurality of uniquely coded transmitters with which it can operate, thereby allowing each transmitting unit to be sold separately from each receiving unit. The system also allows for an operator to personally set the threshold at which a signal detected by a shock detector will result in an alarm being triggered. The system is further selectively operable in either a manual arming mode or a passive arming mode. The system also allows selective operation in either a full current sensing mode in which either a detected shock above an absolute threshold or a Δ threshold, or current flow above a predetermined level, will trigger an alarm system or operation in a shock and current integration mode in which if a detected current exceeding a predetermined threshold and a shock above an absolute or Δ threshold is required to trigger the alarm or a much greater current flow is required to trigger the alarm system.

10 Claims, 6 Drawing Sheets

AUTOMOBILE SECURITY SYSTEM

BACKGROUND OF THE INVENTION

1. Field of the Invention

The present invention is directed to a vehicle security system which is remotely controllable. More particularly, the vehicle security system of the present invention is a microprocessor controlled system which allows transmitting units to be sold as separate units from the receiving units and allows each receiving unit to be used with several transmitters. The present invention also allows for the personalized setting of a shock level detector, allows for the device to be selectively operable to be automatically armed or manually armed, and allows for selective operation in a full current sensing mode or a shock and current integration sensing mode.

2. Discussion of the Background

Remotely controlled automobile security systems are well known in the art. Conventional remote automobile security systems operate such that an operator of a vehicle can remotely activate or turn on an automobile security system after leaving the vehicle and can deactivate or turn off the automobile security system upon returning to the vehicle, by a hand held remote transmitter.

When the vehicle is armed, a conventional automobile security system may operate to detect a situation in which a voltage dip on the automobile battery is sensed or in which current begins to flow through the ignition system of the automobile without the automobile security system having been deactivated, which may be indicative of an unauthorized operation of the automobile. At this point, the automobile may be disabled and an alarm may be activated. Further, conventional remote automobile security systems may operate in conjunction with a shock sensor which will output a signal to an alarm if a shock which exceeds a predetermined threshold is detected by the shock sensor when the automobile security system has been activated. In this way, shocks occurring as an intruder attempts to enter an automobile without authorization will cause an alarm signal to issue if the automobile security system has been activated. Other conventional automobile security systems may feature glass breakage transducers to sense a glass breakage event and issue an alarm after detecting such an event.

However, known remote automobile security systems suffer from several drawbacks. For example, the conventional transmitting unit and receiving unit must be precoded to operate with the same code words, and so a particular transmitter unit can only be used with a particular receiving unit. Moreover, in conventional automobile security systems, shock level sensitivity cannot be easily varied by an operator. Therefore, certain ambient conditions (e.g., thunder, heavy trucks passing by, etc.) may be sufficient to generate disturbances to trigger a conventional shock sensor having a low threshold, resulting in a false alarm. If the operator of the automobile could selectively set the threshold at which the shock sensor is activated, the occurrences of such false alarms could be minimized.

A further drawback of conventional automobile security systems is that they have limited flexibility in the manner in which they become armed and feature simple shock detectors which only detect shocks exceeding a single predetermined threshold.

A further drawback of conventional automobile security systems is that in certain vehicles a voltage or current sensing circuit cannot be utilized and only a shock sensing circuit can be utilized. That is, as noted above, several automobile security systems feature voltage or current sensing circuits in which a voltage dip or current flow is sensed while a security system is activated to trigger the indication of an unauthorized intrusion into the automobile and to cause the automobile to be disabled and/or an alarm to be sounded. For example, when a vehicle door is opened while a security system is activated, the current which flows to activate the inside lights of the vehicle can be detected to trigger an alarm signal.

However, in certain automobiles on the market today current will periodically flow through the automobile electrical system when the car is not being operated. For example, certain vehicles feature mechanical clocks which must be periodically wound. This is automatically done in such vehicles by periodically allowing a current to flow to a motor in the clock which then activates a winding mechanism to wind the clock. This winding operation will often be done while the automobile is not being operated. An automobile security system featuring a current sensing device cannot be utilized in an automobile with such a feature since the current flowing to wind the clock would be detected by the automobile security system and would be read as an unauthorized operation of the vehicle, resulting in the automobile being disabled or in the triggering of an alarm.

SUMMARY OF THE INVENTION

Accordingly, an object of the present invention is to provide a novel remotely controllable automobile security system which overcomes the above-mentioned drawbacks of conventional automobile security systems.

An object of the present invention is to provide a remotely controllable automobile security system in which the receiving unit and transmitting unit of the system need not be precoded and preprogrammed to operate with a particular code and in which several transmitting units can be used with each receiving unit.

A further object of the present invention is to provide novel remotely controllable automobile security system which allows a user to easily vary the setting of a shock level threshold above which an alarm will sound.

A further object of the present invention is to provide a novel remotely controllable automobile security system which allows an operator to easily program whether the system operates in an active arming mode or a passive arming mode.

A further object of the present invention is to provide a novel remotely controllable automobile security system in which a shock detector will feature two threshold levels and in which both a shock and current sensing integration mode can be used in automobiles in which a current sensing circuit alone cannot function.

A further object of the present invention is to provide a novel remotely controllable automobile security system which will automatically vary the set shock level.

These, and other objects of the present invention are achieved by the present invention which includes a microprocessor controlled remotely controllable automobile security system with a control system which allows a receiving unit to "learn" up to a predetermined number of authorization codes from a transmitter, thereby allowing the transmitter to be sold independently of the receiving unit and allowing multiple transmitting units to be used with each receiving unit.

Further, the control system of the present invention allows a user to easily reset a shock level via a remote transmitting unit.

Further, the control system of the present invention operates with a shock sensor to establish two thresholds, an absolute threshold and an intermediate threshold, above which shocks may be detected.

Further, the control system of the present invention allows a user to program the system to selectively operate in either an automatic passive arming mode or a manual active arming mode via a remote transmitting unit.

Further, the control system of the present invention allows for a full current sensing mode and a combination current and sensing integration mode to be implemented to allow the automobile security system to be utilized in an automobile in which the use of a full current sensing mode alone is not possible.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
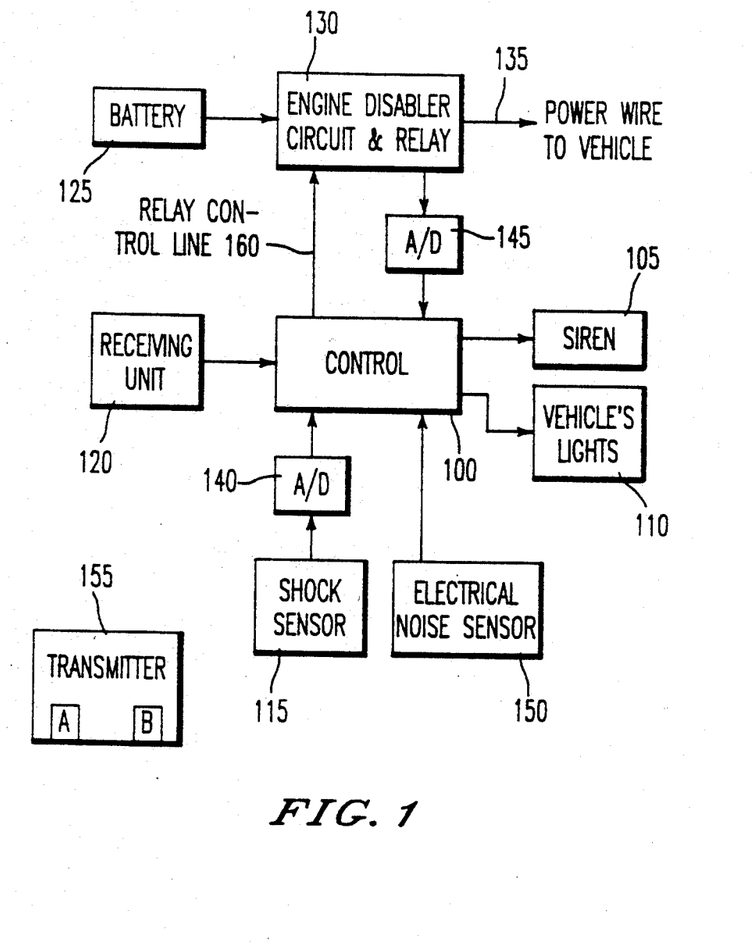
FIG. 1 is a diagram showing the major components of the present invention.

Referring now to the drawings, wherein like reference numerals designate identical or corresponding parts throughout the several views, and more particularly to FIG. 1 thereof, there is shown the elements of the automobile security system of the present invention.

As shown in FIG. 1, the automobile security system of the present invention features a control element 100 which may be a conventional programmable microprocessor. Connected to this control element 100 is a shock sensor 115 which can input a shock signal into the control element via an A/D converter 140. The shock sensor may typically be a conventional unit such as a piezoelectrical element which will provide a current in proportion to a shock that it detects. This current is then converted into a digital signal by A/D converter 140 and is then provided to the control element 100. As will be discussed later, if this current is above a predetermined absolute threshold or a Δ threshold, then its receipt may result in the control system activating the siren 105 or flashing the vehicle lights 110, which are also connected to control circuit 100.

An electrical noise sensor 150 is also connected to control element 100. This electrical noise sensor operates to give an indication that the engine is running. This electrical noise sensor 150 is implemented by a sensor which can detect the voltage of the battery of the automobile 125. When an automobile is running, the battery will have characteristic voltages. By appropriately sensing these characteristics, electrical noise sensor 150 senses when the engine is running and provides a signal indicating such to control element 100.

Also connected to control element 100 is the receiving unit 120 which receives signals sent by the transmitter 155. The receiving unit may be a conventional unit such as a super regenerative decoder. Connected between the battery of the automobile 125 and the control element 100, via A/D converter 145, is an engine disabler circuit 130. An output of this engine disabler circuit 130 will be sent to the power wire of the vehicle. A relay control line 160 allows control element 100 to control a relay switch S1 in engine disabler circuit 130, as will be discussed later.

Figure 7:
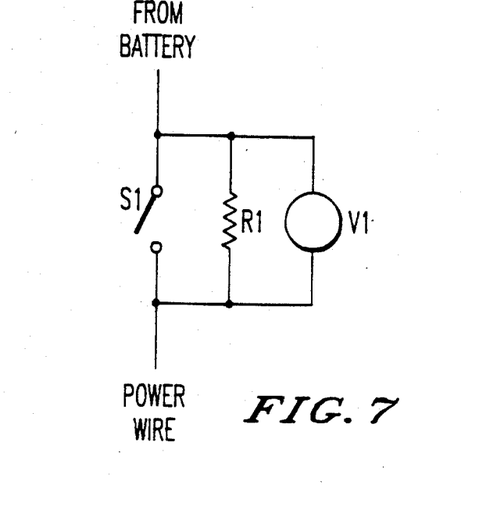

The internal structure of the engine disabler circuit of element 130 is shown in FIG. 7. The disabler operates to receive power from the battery of the vehicle which will pass through a relay switch S1 and be available to the power wire of the vehicle to provide power to the vehicle as a whole. In parallel with the relay switch S1 is a shunt resistor R1 and a voltmeter V1. Relay switch S1 is controlled by the control element 100, via relay control line 160, and the voltage across resistor R1 is sensed by voltmeter V1 and input to the control element 100 via A/D converter 145. When relay switch S1 is closed, current from the battery will flow to the power wire and the relay switch S1 will have no effect on the operation of the automobile. However, when the relay switch S1 is open, current will pass through resistor R1 and then to the power wire to power the vehicle as a whole. When current is passing through resistor R1, the voltage across resistor R1 is measured by voltmeter V1. This voltage is then converted into a digital signal by A/D converter 145 and is input to control element 100. Thus, this relay switch S1 functions as a voltage sensing device of the automobile security system.

Figure 2:
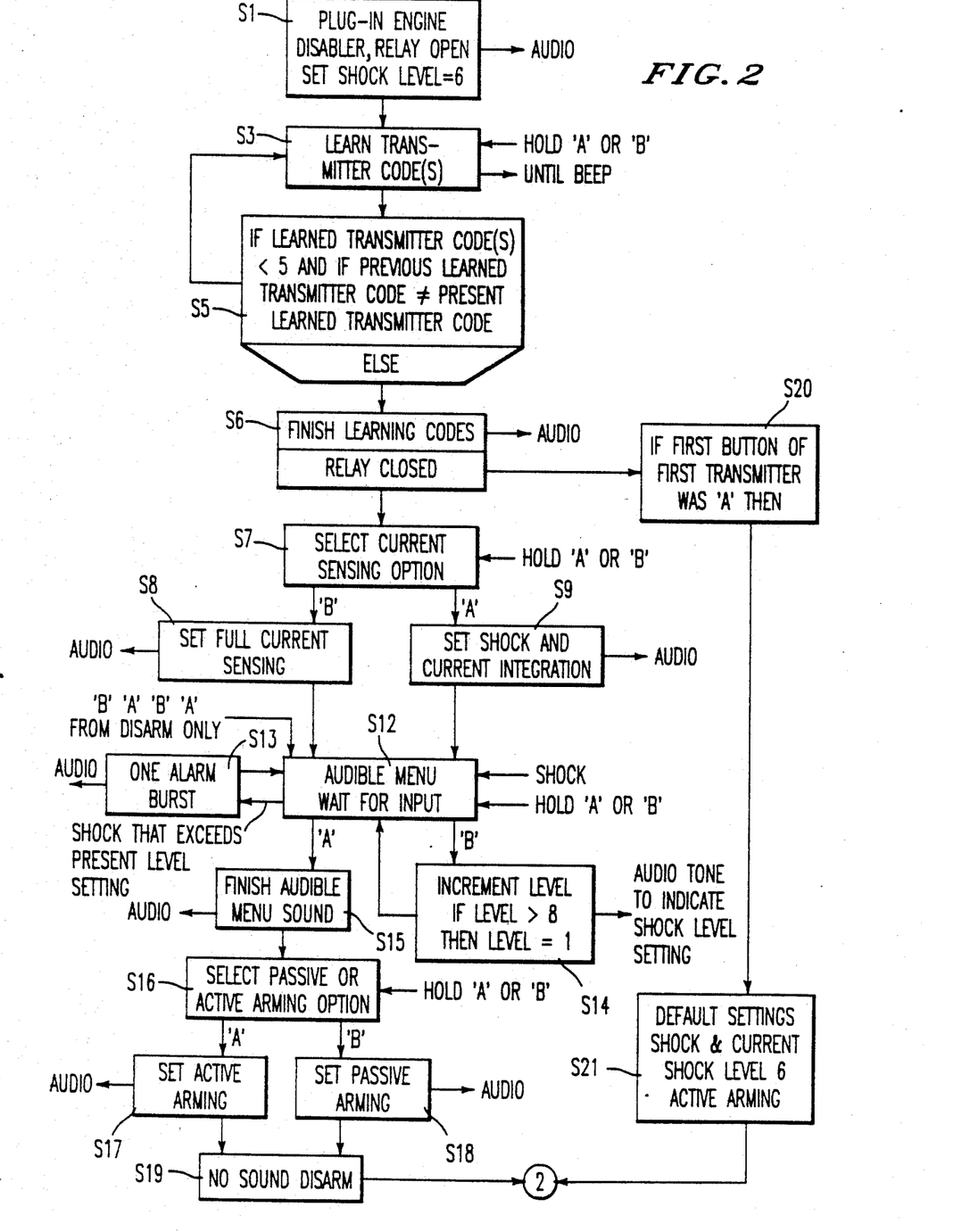
FIG. 2 is a flow chart showing the start-up procedures for the automobile security system of the present invention.

Turning now to the flow chart of FIG. 2 which details the steps followed by the control system 100 of the present invention during start-up procedures.

In step S1 the unit is being installed in a vehicle in conjunction with the engine disabler circuit and the relay switch S1 is open. At this time, an initializing sound indicating that the unit has been properly installed is given to the operator as an audio indication. Also, the system automatically sets the shock level to a predetermined threshold, as shown as level "6" out of "8" levels, as an example.

At this point, the automobile security system unit is waiting to "learn" the code of the transmitter(s) it is to be activated by and with which it is to operate. Thus, according to the present invention, the remote unit of the automobile security system which is to be installed into the automobile can be sold separately from the transmitting unit. That is, after an operator has purchased the remote unit of the security system (which may or may not come prepackaged with one or more transmitters) he can then purchase another transmitter(s) or up to a predetermined number, e.g. five, of transmitters, as will be discussed later, to operate with that remote unit. The remote unit and transmitter need not be manufactured together in the sense that they need not be precoded to operate with the same code words and need not be sold together as a package. Further, according to a preferred embodiment of the present invention, the transmitter will feature two unique signals, called herein button bits, which it can transmit which are hereby indicated as A and B. For this purpose, the transmitter may feature two buttons, one which transmits a first unique signal A when depressed, and another which transmits a second unique signal B when depressed.

After the remote unit has been installed in the vehicle, in step S3 the remote unit waits for three identical consecutive code words which will include a button bit. That is, at this point in the set-up procedures of the automobile security system, the operator utilizes his transmitter to transmit a signal by depressing either button A or button B on the transmitter. This transmitted signal will then be received by the remote unit and when three identical consecutive code words are received, this code word is stored and "learned" by the receiving unit in step S3. Receiving three consecutive code words simply means that the button of the transmitter must be depressed for a long enough period of time (about ½ second) to transmit the code word unique to that transmitter three times, thereby ensuring that the first code word received by the remote unit is correct. This prevents an erroneous or noise signal from causing an incorrect code word to be received and stored in the remote unit.

After the receiving unit does receive three identical consecutive code words, this code word is stored in a memory in the control circuit 100 and this code word is "learned" by the control system. Further, a plurality of unique code words may be stored as authorization codes. The system then proceeds to step S5. As indicated in step S5, the automobile security system allows five codes to be stored thereby allowing five separate transmitters to be used with each security system. Thus, if fewer than five learned codes have been received and if none of the previously learned codes is the same as the presently received code, then step S5 causes the system to return to step S3 to "learn" the code word presently being transmitted and received. Otherwise, if there are already five "learned" codes or if the presently detected code has already been stored, then the system proceeds to step S6. Step S6 determines that the system is now "finished learning codes", and gives an audio indication of such, and also closes the relay switch S1 in the engine disabler allowing the user to then start the vehicle since the proper start-up procedure was followed.

After the relay switch S1 is closed in step S6, the system determines, in step S20, whether the button pressed at step S3 was an A or a B. If the button pressed at step S3 was an A, the system then proceeds to step S21 and sets the system with default settings. As an example, the default settings may set the system in a shock and current sensing mode, set the shock level at "6" and set an active arming mode. If the button pressed at step S3 was a B, the system will proceed from step S6 to step S7.

In step S7 the operator can then select whether the automobile security system is to operate in a "full current sensing" mode or a "shock and current integration" mode by pressing one of the two buttons on the transmitter. For example, if at step S7 the operator depresses button B, then the automobile security system will be set to operate in the "full current sensing" mode and proceed to step S8. Whereas, if the operator depresses button A at this point then the system will be set to operate in the "shock and current integration" mode and proceed to step S9. The operation of the security system in these two modes is discussed below. An audio indication is outputted after the operator has selected the desired mode and the system then proceeds to step S12.

While in step S12, if the shock sensor senses a shock that exceeds the current shock level setting, then the control system proceeds to step S13 and issues one alarm burst as an audio indicator. After this one alarm burst is issued, the control system returns to step S12. Thus, at this point the operator can "test" the shock level setting of the security system by bumping the vehicle. If the operator finds the default shock level setting to be either oversensitive or undersensitive, then the shock level setting can be easily varied as discussed below.

To vary the shock level setting while in this waiting step S12, the operator depresses button B on the transmitting unit and then the control system proceeds into step S14 and increments the level at which the shock sensor is set. That is, when button B is depressed while the system is at step S12, and for each time button B is depressed, the control system will increment the level at which the shock sensing circuit is set by one level, as indicated in step S14. Thus, depressing button B at this point increases the level at which the shocking circuit is set, thereby increasing the magnitude of the shock which is necessary to trigger the alarm. At this point, the operator can again "test" the shock level setting by bumping the vehicle and determining what magnitude of shock is required to trigger an alarm by listening for the one alarm burst after each bumping of the vehicle. Further, a sound distinguishing tone or tune can be implemented in step S14 to indicate the level at which the shock sensor is set. For example, the system can operate such that each increase in shock level is indicated by a tone of increasing pitch, i.e. Doe, Rae, Me. After the shock level has been reset at step S14, the control system returns to step S12. At this point, the operator depresses button A on the transmitter and the system proceeds to step S15, thereby determining that the shock sensing set-up procedures have been completed and providing a finish "audible menu sound".

The system of the present invention then proceeds to step S16 where the operator determines whether the system will be set up in a "passive arming" mode or an "active arming" mode. That is, at step S16 if, for example, the operator depresses button A on the transmitter, the system will be set in an "active arming" mode. The start-up procedures are then complete and the system disarms itself in step S19. And, if at step S16 the operator depresses button B on the transmitter, the system will be set in a "passive arming" mode and provide an audio indication of such.

When the system is in the "active arming" mode the operator will have to depress button A on the transmitter as he leaves the automobile to activate the automobile security system. In the "passive arming" mode, however, the system will automatically arm the automobile security system after a predetermined lapse of time after the vehicle has stopped operating. For example, in the "passive arming" mode, 60 seconds after the vehicle has been turned off, the automobile security system will automatically be activated.

Further, the level at which the shock sensing circuit is set and the "active" or "passivie arming" mode setting can be changed after the start-up procedures are finished. That is, as shown in step S12, if after the start up procedures have been completed the operator consecutively depresses buttons BABA on the transmitter, the system will proceed back to step S12 at which point the shock level can be reset or the system can be switched again between the "active arming" mode and the "passive arming" mode.

Once the start-up procedures of the automobile security system of the present invention have been completed, the system is ready for operation as is described with reference to FIGS. 3-6 below.

Figure 6:
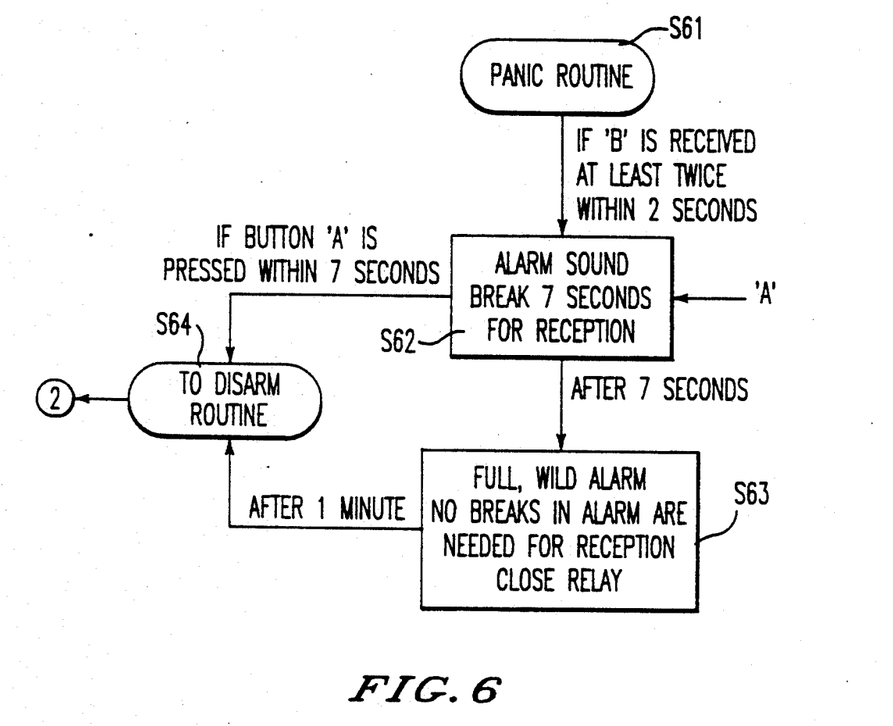
FIG. 6 is a flow chart showing operation in a panic mode of the present invention; and, FIG. 7 is a detail showing the relay circuit of element 130.

One feature of the automobile security system of the present invention is the provision of a "panic routine", shown in FIG. 6, which can be activated by an operator at any time by holding the B button on the transmitter for two seconds, i.e. by depressing the B button for two consecutive seconds. This is indicated as 'B' 'B' in the figures. The "panic routine" begins at a step S61 which represents a state subsequent to establishing the start-up procedures described with reference to FIG. 2. If, in step S61, the operator depresses the B button on the transmitter twice within two seconds, the system proceeds to step S62. In step S62 an alarm will sound for seven seconds. If within the seven seconds that the alarm is sounding the operator presses button A, then the system will move into the panic disarm routine at step S64 and then to step S25. In this way, the operator can stop the "panic routine" at this point if it was entered into erroneously. If the seven seconds pass without receiving a signal from the operator, then the system moves into step S63 in which a full alarm is activated and the relay switch S1 of the engine disabler is closed. After one minute of the full alarm in step S63, the system proceeds to the disarm routine at step S64 and then to step S25 of FIG. 3.

With such a feature, an operator of the automobile security system of the present invention can remotely activate the alarm system of the vehicle by holding the B button for two seconds, and if such activation was erroneous, the operator can depress the A button after the initial alarm has been activated to deactivate the alarm. If, however, the activation of the "panic routine" was not erroneous, then it will quickly move into the full alarm mode. Such a "panic routine" may be utilized if an operator is confronted by an intruder just prior to arriving at their vehicle or may be used to guide an operator to their vehicle in a crowded parking lot.

The further normal operating procedures of the automobile security system of the present invention will now be described with reference to FIGS. 3-5 below.

Figure 3:
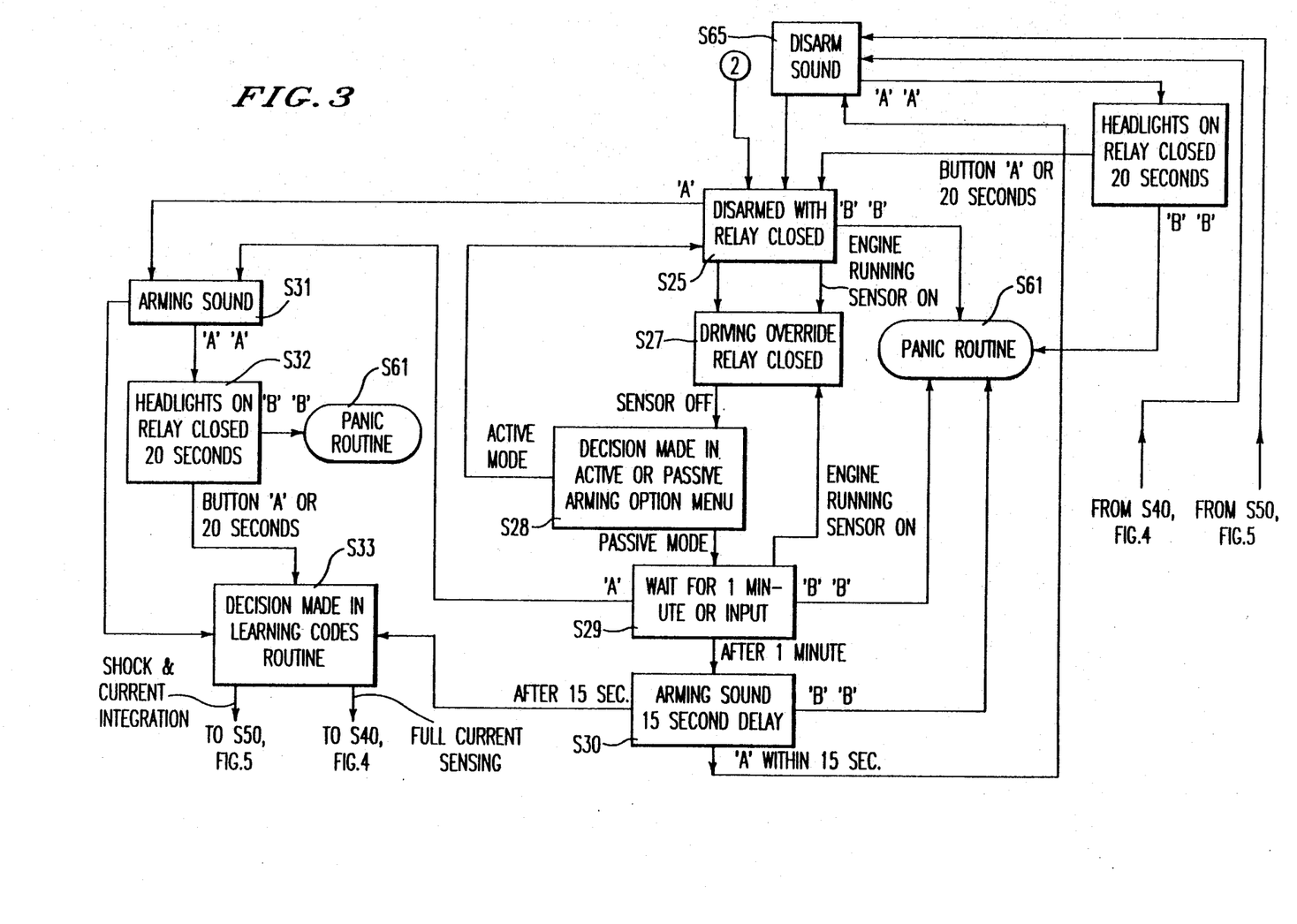
FIG. 3 is a flow chart showing the normal operating procedure of the automobile security system of the present invention.

As shown in FIG. 3, after the start-up procedures of FIG. 2 have been completed or after the system has gone through a "panic routine", the system proceeds to step S25 where the system is disarmed and the relay switch S1 is closed. At this point, if the operator holds button B on the transmitter for two seconds, the system will proceed into the panic routine described with reference to FIG. 6. Further, if at this point, the operator depresses button A of the transmitter, the system will move to step S31 to become armed and give an audio indication arming sound. In step S31, if the operator holds button A on the transmitter for two seconds, then the headlights will turn on and the relay switch S1 will be closed for 20 seconds, as the system proceeds to step S32. In this way, the operator can turn the lights of the vehicle on to provide light when leaving the vehicle. Then, after the 20 seconds passes, or if the operator again presses button A, the system proceeds to step S33 where it is determined which sensing mode was set up in step S7 of FIG. 2. That is, at step S33, the system will determine whether the security system is to operate in either the "full current sensing" mode or the "shock and current integration" sensing mode as was set up in step S7 of FIG. 2. Also, while at step S32, if the operator holds the B button for two seconds, the system proceeds into the "panic routine".

After step S25, if the operator does not proceed to go into the "panic routine" or arming mode, then the system will automatically arm itself if the automobile is running and if it was set to the "passivé arming" mode in step S16 of FIG. 2. Electrical noise sensor 150 shown in FIG. 1 can detect when the automobile is running. While in step S25, if the electrical noise sensor determines that the automobile is running, the system then proceeds to step S27.

Thus, when the system is at step S25, if the automobile is running the system proceeds to step S27 in which it is in a driving override mode and the relay switch S1 is closed. At this point, it is assumed that the automobile is being operated with authorization. When the system is at step S27, and when electrical noise sensor 150 indicates that the vehicle is no longer being operated, i.e. the sensor is off, the system then proceeds to step S28. Steps S25 and S27 operate to determine whether the automobile is being operated since if the automobile is not being operated and if the security system is set to the passive arming mode, then the control system must automatically arm the security system.

In step S28, it is decided whether the "active arming" mode or the "passive arming" mode was selected in step S16 of FIG. 2. If the "active arming" mode was selected in step S16 of FIG. 2, the system proceeds back to step S25. If the "passive arming" mode was set in step S16 of FIG. 2, then the system proceeds to step S29. While in step S29 the system will wait for one minute, i.e. will wait until the vehicle has stopped running for one minute, or until it receives an input of A from the transmitter. Further, at this point the system can also be set into the "panic routine" by holding the B button on the transmitter for two seconds or can be set into the arming mode, step S31, by receiving an A from the transmitter. After, the one minute passes, the system proceeds from step S29 to S30 and provides an arming sound. After a further lapse of time, for example 15 seconds, the system will proceed to step S33. While in step S29, if engine noise sensor 150 indicates that the vehicle is running, the system proceeds back to step S27.

In the "passive arming" mode the security system will become armed if either the operator actively arms the security system by depressing A on the transmitter of if the electrical noise sensor 150 detects that the automobile has not been running for one minute.

Also, at step S30, if the operator holds the B button for two seconds, it will send the system into the "panic routine". As noted above, if 15 seconds passes at this point, however, the system proceeds into step S33. Further, while the system is in step S30 if the operator depresses A within 15 seconds, the system will proceed to step S65 which provides a disarming sound and the system then proceeds to step S25. In this way, if the operator hears the arming sound after step S29, but decides that the security system should not be armed for any reason, then the operator can disarm the security system if the button A on the transmitter is depressed within 15 seconds of hearing the arming sound. Otherwise, if the operator does want the security system to become armed, it will automatically arm after the 15 seconds have elapsed.

After the system has operated through to step S33, then the system will move into either the "full current sensing" mode or the "shock and current integration" mode depending on which mode was set at step S16 of FIG. 2. If in step S16 of FIG. 2 the "full current sensing" mode was selected, then when the system enters step S33 the system will automatically proceed to step S40, shown in FIG. 4. In step S40 the automobile security system of the present invention will be armed and the relay switch S1 will be open so that the voltmeter V1 can detect any current flow. At this point, if the operator holds the B button on the transmitter for two seconds the system will automatically proceed into the "panic routine". Further, when the system is in step S40 it is armed and the operator can disarm the unit by depressing the button A on the transmitter causing the system to provide a disarming sound at step S65 and then proceed to step S25.

When the system is fully armed and is at step S40, if the voltmeter V1 senses a current which is greater than or equal to 5 amps, or alternatively senses an increases in the current, the system will proceed to step S41 where the alarm will sound for one minute and the relay switch S1 will remain open. That is, at this point the system will recognize unauthorized operation of the vehicle. If there is an increase in current, or current flow of 5 amps, this may indicate that a door has been opened, thereby drawing current to operate the indoor lights, or that the vehicle has been started in some manner. As the security system is armed at this point, this is determined to be an unauthorized operation of the vehicle causing the alarm to sound and the headlights to flash as indicated in step S41.

Further, while in step S40, if the shock sensors of the security system detect a shock which exceeds the shock level set in the start-up procedures of FIG. 2, then the system also proceeds to step S41 and sounds the alarm.

However, if the security system is in step S40 and a shock is detected which is less than the shock level set by the start-up procedures of FIG. 2, but is still greater than a predetermined $\Delta$ threshold, which may be a function of the shock level set, then the system proceeds to step S42. That is, the present invention has a further feature in setting a $\Delta$ threshold level which may be a function of the shock level set by the start up procedures of FIG. 2. For example, this $\Delta$ threshold level may be set to be two shock levels higher than that set by the start-up procedures of FIG. 2. Thus, if the shock level set in the start up procedures of FIG. 2 is "6" the $\Delta$ threshold level may be "8", level "8" representing where the system is most sensitive to shocks and level "1" representing where the system is least sensitive to shocks, i.e., a greater shock is needed to set off the system when set at level "8" than when set at level "1". While at step S40, if a shock exceeding this $\Delta$ threshold is detected, the system proceeds to step S42 at which point a half second alarm burst is issued and the shock sensitivity of the shock sensor is decreased for ten seconds.

As an example, if a shock exceeding the $\Delta$ threshold is detected in step S41, in step S42 the alarm will sound for one half second and, if the a threshold was set at "8", the threshold level will be reset to "7" thereby decreasing the shock sensitivity. While at step S42, if ten seconds pass with no further events occurring, then the system proceeds to step S43 to reset the shock sensitivity back to the original level, in this example "8", and the system proceeds back to step S40. However, if the system is at step S42 and a shock is received within ten seconds which exceeds the new threshold reset in step S42, in this example level "7", or which exceeds the absolute shock level set by the start-up procedures of FIG. 2, then the system proceeds to step S41 to sound an alarm.

Further, while at step S42 the operator can proceed into the "panic routine" by holding the B button on the transmitter for two seconds or can proceed to the disarming mode by depressing A on the transmitter. Also, while at step S42, if a current is detected by the voltmeter V1 which is above 5 amps, or if there is an increase in current, the system also proceeds to step S41 to sound the alarm.

While in step S41, if the operator depresses A on the transmitter or after one minute has lapsed, the system will proceed back to the armed state S40 and the alarm will cease to sound. In this way, the operator can stop the alarm from sounding immediately or the alarm will automatically stop after one minute if there is no current flowing or shocks detected to cause the security system to proceed through the alarming routine again.

Figure 5:
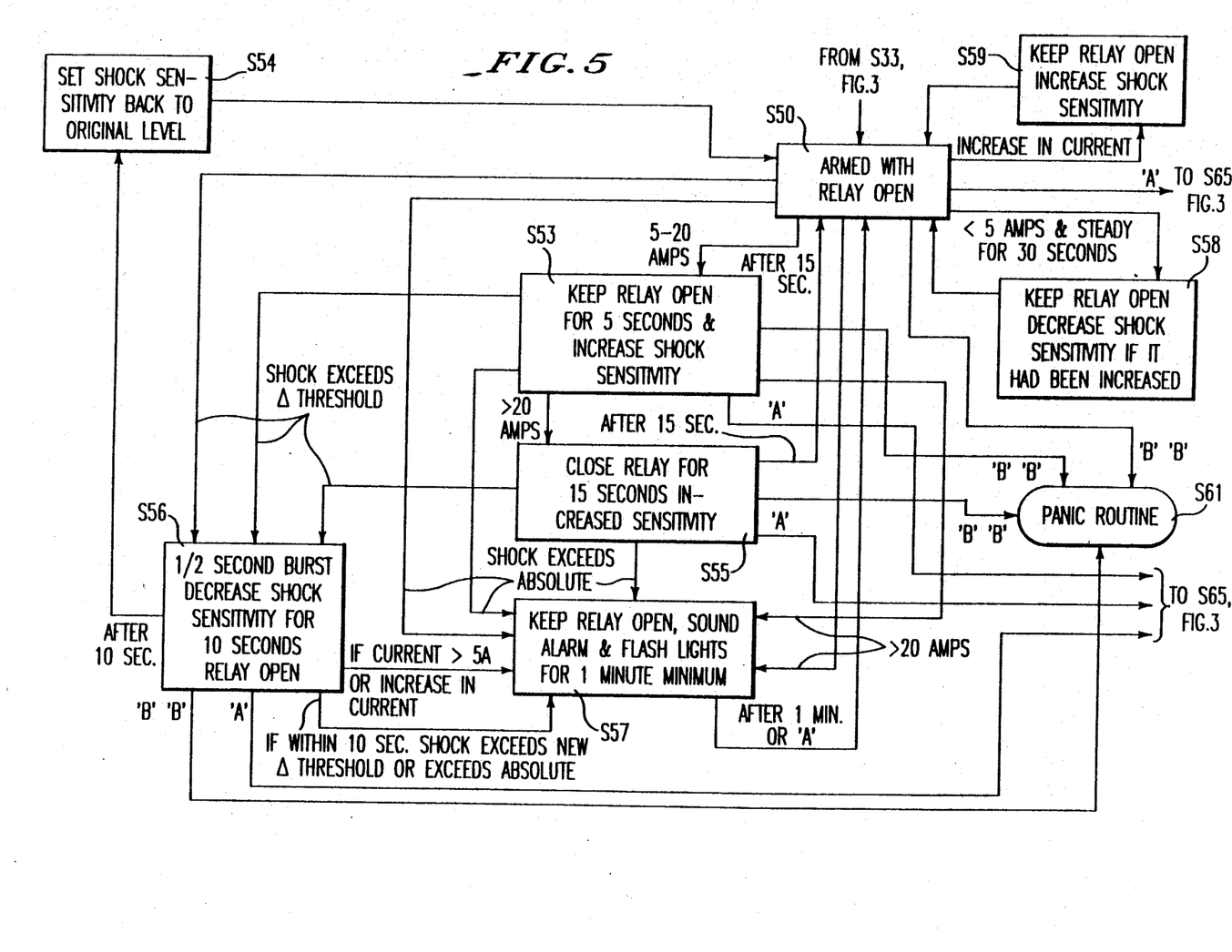
FIG. 5 is a flow chart showing operation in the shock and current integration sensing mode of the present invention.

FIG. 5 shows the operation of the system when the "shock and current integration" mode was set in step S7 of FIG. 2. That is, when the "shock and current integration" mode was set in step S7 of FIG. 2 and the system reaches step S33 of FIG. 3, it automatically proceeds to step S50 in FIG. 5. At step S50 the system is armed and the relay switch S1 is open to detect current flow with voltmeter V1. While at step S50, if a shock is detected which exceeds the absolute shock level set in the start-up procedures of FIG. 2, then the system automatically proceeds to step S57 and sounds an alarm for one minute and flashes the head-lights. While at step S57, after the lapse of the one minute during which the alarm sounds, or after the operator depresses A on the transmitter, the system will proceed back to step S50 and be armed with the relay switch S1 open.

Figure 4:
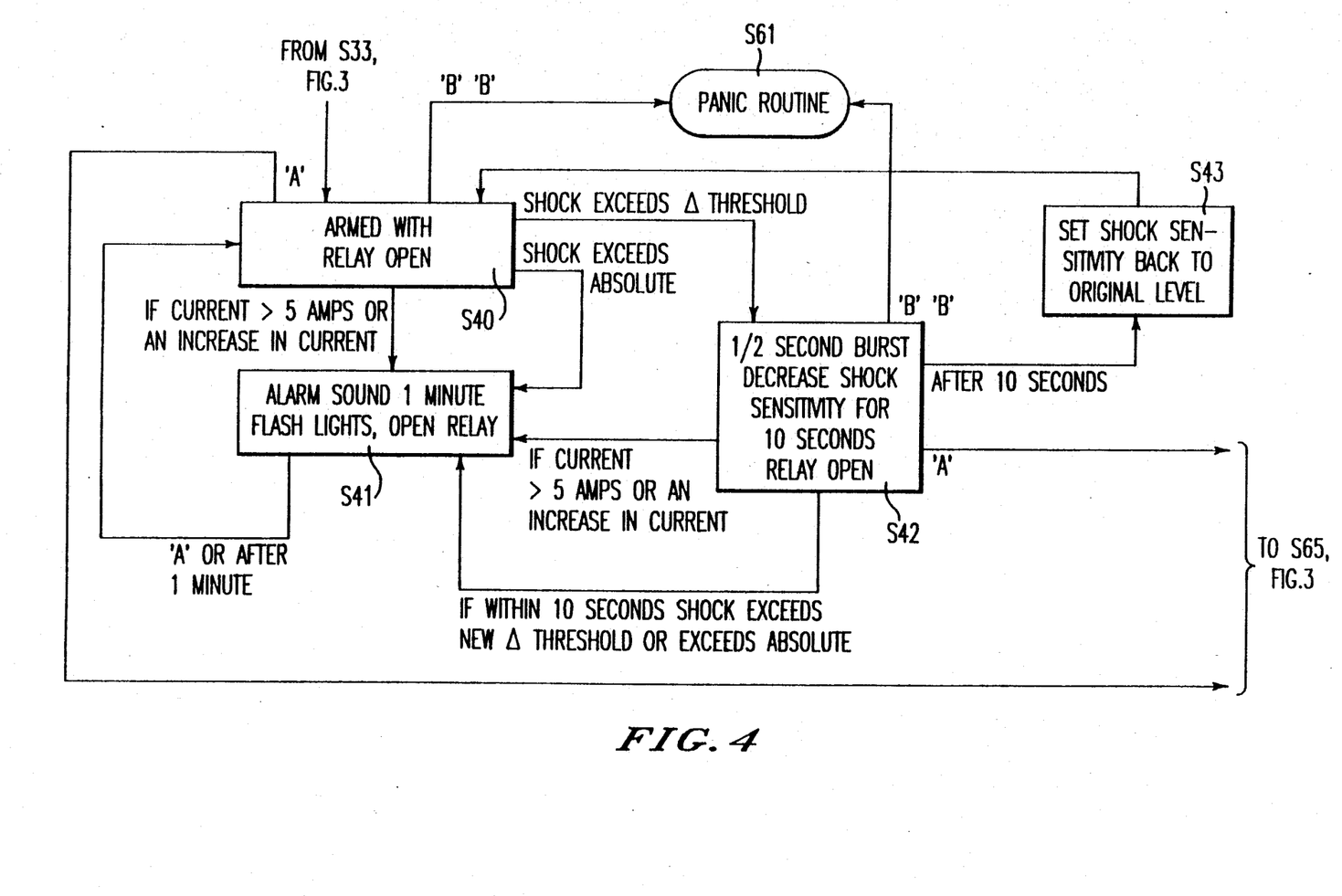
FIG. 4 is a flow chart showing operation in the full current sensing mode of the present invention.

Also, while in step S50 if a shock is detected which exceeds the $\Delta$ threshold, then the system proceeds to step S56 which results in the issuing of a half second alarm burst and decreasing the $\Delta$ shock sensitivity for ten seconds, similar to the sequence described with respect to step S42 of FIG. 4. Further, while at step S56 if ten seconds elapse without any further events, then the system proceeds to step S54 where the $\Delta$ shock sensitivity is reset back to its original level and the system then automatically proceeds back to step S50. Further, if while at step S56 the operator depresses A on the transmitter, then the system will issue a disarming sound as it proceeds to step S65, and return back to step S25 and be in the disarmed state with the relay switch S1 closed. Further, if while at step S50 or step S56 the operator holds the B button on the transmitter for two seconds, then the system will proceed into the "panic routine".

Also, while in step S56 if the shock sensor detects a shock which exceeds the new $\Delta$ threshold or the absolute shock level set by the start-up procedures of FIG.

2, then the system proceeds to step S57 and issues an alarm. This procedure is the same as that with reference to steps S42 and S41 described in FIG. 4.

However, in the "shock and current integration" mode, if the system is at step S56 and the current sensor detects a current which is greater than 5 amps, or if there is an increase in the current, then the system also proceeds to step S57 and issues an alarm. In this way, either a shock which exceeds the Δ threshold, and a current greater than 5 amps, or an increase in current, is required to proceed to step S57 and sound the alarm. Thus, the "current and shock integration" mode in this case requires both current and shock before an alarm is activated. The reason for this is, as noted earlier, that certain vehicles have operations which periodically draw a small current. The "shock and current integration" mode of the present invention allows these small currents to be ignored by requiring a current and a Δ threshold shock level to be detected before issuing an alarm.

When in step S50, if a current is detected which is between 5 and 20 amps, the system proceeds to step S53 in which the relay switch S1 is opened for five seconds and the shock sensitivity is increased. Further, while at step S53 if a shock is detected which exceeds the Δ threshold then the system proceeds to step S56. Further, also while in step S53 if the operator holds the B button on the transmitter for two seconds, the system proceeds to the "panic routine", and if the operator depresses the A button the system proceeds to give a disarming sound at step S65 and then proceeds to step S25.

Further, while in step S53 if a shock is detected which exceeds the absolute shock level set in the start-up procedures of FIG. 2, then the system proceeeds to step S57 and sounds the alarm for one minute.

Also, while in step S53 if five seconds elapse and the current sensor is still detecting a current which is less than 20 amps, then the system proceeds to step S55. At step S55 the relay switch S1 is closed for 15 seconds to no longer detect current. During this 15 seconds in which the relay switch S1 is closed, if the system detects a shock level which exceeds the Δ threshold then the system proceeds to step S56. Also, if at step S55 the system detects a shock which exceeds the absolute shock level set by the start-up procedure of FIG. 2, then the system proceeds to step S57 and issues alarm.

If, however, the system is maintained in step S55 for greater than 15 seconds, then the system returns to step S50 in which it is armed and the relay switch S1 is opened. In this way, if the system detects current flow which is less than 15 amps, i.e., which normally corresponds to an event such as a battery providing power for rewinding of a clock or a door opening and triggering a dome light to turn on, etc., then the system will also require a shock which is at least above the Δ threshold in conjunction with the current sensed before the alarm is activated. Thus, in vehicles which periodically draw current while they are not in operation, the "shock and current integration" mode should be set so that the periodic drawing of current alone will not activate the alarm. However, when the current sensing is combined with a shock, which will accompany an intruder breaking into a vehicle without authorization, this results in the alarm sounding. Thus, the "shock and current integration" mode feature of the remotely controllable vehicle security system of the present invention allows the security system to be installed in vehicles in which a current sensing operation alone is not feasible.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A remotely controllable vehicle security system comprising:
    a control unit installed in a vehicle for controlling operation of said security system;
    a transmitting unit for remotely controlling said control unit;
    a shock sensor connected to said control unit to provide an input into said control unit, said input conveying a magnitude of a shock detected by said shock sensor;
    means in said control unit for automatically setting a shock level at a predetermined level, wherein when a shock is detected by said shock sensor which extends said predetermined shock level an alarm is activated by said control unit;
    means for an operator to reset, via the transmitting unit, the shock level setting;
    first means in said control unit for sensing an unauthorized entry into said vehicle comprising:
        first means for sensing if a shock from said shock sensor exceeds a first predetermined threshold and issuing an alarm in response thereto;
        second means for sensing if a shock from said shock sensor exceeds a second predetermined threshold, a level of said second predetermined threshold being less than a level of said first predetermined threshold;
    second means in said control unit for sensing an unauthorized entry into said vehicle comprising:
        first means for sensing a current which exceeds a first predetermined current threshold and issuing an alarm in response thereto;
        second means for sensing a current which exceeds a second predetermined current threshold, said second predetermined current threshold being less than said first predetermined current threshold; and
        means for issuing an alarm when both a current exceeding said second predetermined current threshold and a shock exceeding said second predetermined shock threshold are sensed.

2. The security system according to claim 1, further comprising:
    means for providing an audio indication of said reset shock level.

3. The security system according to claim 1, further comprising:
    means in said control unit for operating the security system in an active arming mode wherein the security system must be armed by an arming signal transmitted from said transmitting unit;
    means in said control unit for operating the security system in a passive arming mode in which the security system is automatically armed after either a predetermined time has elapsed after the vehicle stops operating or after an arming signal is transmitted from said transmitting unit; and means for an operator to selectively program the security system to operate in either the active or passive arming mode.

4. A remotely controllable vehicle security system comprising:
 a control unit installed in a vehicle for controlling operation of said security system;
 a shock sensor providing an input to said control unit;
 a transmitting unit for remotely controlling said control unit;
 means in said control unit for sensing an unauthorized entry into said vehicle comprising:
  first means for sensing if a shock from said shock sensor exceeds a first predetermined threshold and issuing an alarm in response thereto;
  second means for sensing if a shock from said shock sensor exceeds a second predetermined threshold, a level of said second predetermined threshold being less than a level of said first predetermined threshold;
  means for decreasing a sensitivity of said shock sensor when a shock exceeding said second predetermined threshold is detected, and wherein said alarm is also issued if a shock which exceeds said decreased shock sensitivity level is detected within a predetermined time after decreasing the sensitivity of said second sensing means.

5. The security system according to claim 4, wherein the level of said second predetermined threshold is a function of the level of said first predetermined threshold.

6. The security system according to claim 4, further comprising means in said control unit for permitting an operator to reset the level of said first predetermined threshold.

7. A remotely controllable vehicle security system comprising:
 a control unit installed in a vehicle for controlling operation of said security system;
 a transmitting unit for remotely controlling said control unit;
 means in said control unit for sensing an unauthorized entry into said vehicle comprising:
  first means for sensing a current which exceeds a first predetermined current threshold and issuing an alarm in response thereto;
  second means for sensing a current which exceeds a second predetermined current threshold, said second predetermined current threshold being less than said first predetermined current threshold;
  means for sensing a shock which exceeds a predetermined shock threshold; and
  means for issuing an alarm when both a current exceeding said second predetermined current threshold and a shock exceeding said predetermined shock threshold are sensed.

8. A security system according to claim 7, further comprising:
 means for sensing a shock which exceeds an absolute shock threshold which is greater than said predetermined shock threshold, and issuing an alarm in response thereto.

9. A security system according to claim 7, further comprising:
 means for decreasing a sensitivity level of said shock sensing means when a shock exceeding said predetermined shock threshold is detected, and means for issuing an alarm when a shock which exceeds said decreased shock sensitivity level is detected within a predetermined time after decreasing the shock sensitivity level.

10. A security system according to claim 9, wherein said predetermined time is 10 seconds.

* * * * *